Dec. 27, 1938.   H. W. WALLACE   2,141,202
METHOD OF MAKING A DIAMOND TOOL
Filed Oct. 17, 1936
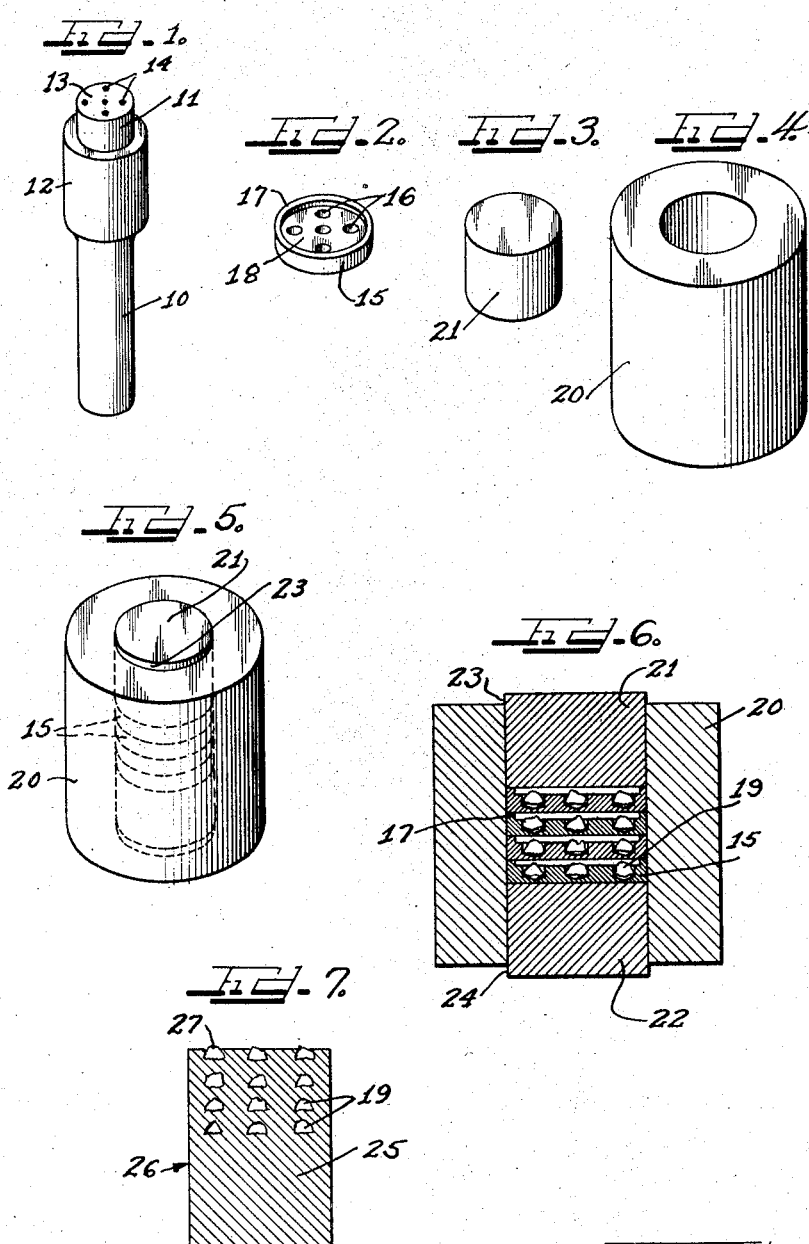
Inventor
HARRY W. WALLACE.
by Charles O. Hills Attys.

Patented Dec. 27, 1938

2,141,202

UNITED STATES PATENT OFFICE 2,141,202

METHOD OF MAKING A DIAMOND TOOL

Harry W. Wallace, Highland Park, Mich., assignor to Wheel Trueing Tool Company of Delaware, Detroit, Mich., a corporation of Delaware Application October 17, 1936, Serial No. 106,127

4 Claims. (Cl. 76—101)

This invention relates to a method of making a diamond tool. More particualrly the invention relates to the manufacture of diamond trueing tools and the like wherein diamond particles are embedded in a metal matrix in a predetermined arrangement or design.

It has heretofore been proposed to manufacture diamond tools by sintering a mass of metal powder having diamond particles dispersed therethough and held in a form or mold, applying pressure during the sintering operation to cause the metal particles to coalesce together and hold the diamond particles in place. It is, however, rather difficult in carrying out this method to position the diamonds to the best advantage within the molded matrix. The method, furthermore, requires the use of rather expensive ingredients, such as tungsten carbide, cobalt, and similar carbides of metals.

I have now found that satisfactory diamond tools can be prepared without resorting to a sintering operation. In accordance with my method, preformed metal disks, slugs, or the like, are provided with means for locating one or more diamonds and then the diamond, or diamonds, is embedded in place in the metal of the disk, slug, or the like, by a welding and upsetting operation. For example, a plurality of preformed disks having diamonds positioned thereon in predetermined arrangement are superimposed one on the other and the stack of disks so formed are placed between the electrodes of a welding machine and subjected to welding temperatures and to upsetting pressures to cause the metal of the disk to flow around and enclose the diamond particles without disturbing their relative position. In this way, diamond tools can be formed with accurate positioning of the diamonds within the metal matrix.

It is therefore an important object of this invention to provide a method of making diamond tools and the like wherein the diamond particles can be accurately positioned within the metal of the matrix and the matrix itself can be formed from relatively inexpensive metal by a combined welding and upsetting operation.

It is a further important object of this invention to provide a diamond tool comprised of a plurality of disks welded together with the diamonds located in accordance with the predetermined arrangement and firmly held in place therein by the metal of the weld.

Other and further important objects of this invention will be apparent from the disclosures in the specification and the accompanying drawing.

This invention (in a preferred form) is illustrated in the drawing and hereinafter more fully described.

On the drawing:

Figure 1 is a perspective view of a finished tool embodying the principles of my invention.

Figure 2 is a perspective view of a disk of metal having depressions for receiving diamonds or other abrasive particles in predetermined arrangement.

Figure 3 is a perspective view of an end plug used in the upsetting operation.

Figure 4 is a perspective view of a collar.

Figure 5 is a perspective view of an assembly of a plurality of disks and upsetting ends in a collar preparatory to the welding and upsetting operation.

Figure 6 is a longitudinal sectional view of the assembly.

Figure 7 is a sectional view of the tool proper with the diamond particles in elevation, after removal of the excess metal from the assembly.

The finished diamond tool of my invention comprises a holder 10 and a tool proper 11 secured in an enlarged end 12 of the holder and protruding therefrom to present a trueing face 13 in which a plurality of abrasive particles 14, such as diamonds, are embedded. While this invention will be described particularly in connection with the making of a diamond impregnated trueing tool, it will be understood that other kinds of abrasives, such as particles of metallic carbides, like tungsten and silicon carbides may be employed.

In accordance with my invention, a metal disk 15, or a plurality of such disks, is formed with means such as depressions 16 for locating the abrasive particles in a predetermined arrangement. The disk 15 is preferably provided with an annular rim 17 and the depressions 16 are formed in the depressed face 18 of the disk. The recesses 16 may, of course, be arranged in any desired manner and there may be one or a plurality of such recesses provided.

A plurality of the disks 15 with the diamond particles 19 arranged as desired in the recesses 16, are assembled in a collar 20 between upper and lower upsetting ends 21 and 22, respectively. As so arranged, the rims 17 of the individual disks 15 are in contact with the lower face of the next adjacent disk or with the undersurface of the upsetting end 21. The upsetting ends 21 and 22, which are of a sutiable metal, such as steel, are of such thickness that they project slightly, as at 23 and 24, beyond the ends of the collar 20 to insure good electrical contact between such ends and the electrodes of the welding device used effecting the welding and upsetting step.

The assembly thus prepared is then placed between the movable electrode abutments of a welding machine and sufficient current passed through the upsetting ends 21 and 22 and the disk 15 to melt down or soften the metal of the rim portions 17 and cause such metal to flow in and around the diamonds 19 to completely enclose and embed the same in the resulting matrix. When the assembled disks have reached the proper welding temperature, an upsetting pressure is exerted endwise through the end members 21 and 22 to cause a flow of molten, or softened metal into any existing cavities or voids and thus complete the embedding of the diamond particles 19 within the homogeneous matrix 25.

During the upsetting operation, the amount of the upset is sufficient that the end faces of the upsetting ends 21 and 22 are brought practically flush with the end faces of the collar 20. After the completion of the welding and upsetting operation, the excess of metal, comprising the collar 20 and the upsetting end 21, is removed, as by cutting, grinding or the like, to produce a cylindrical tool 26 (Fig. 7) containing the diamonds 19 in the predetermined arrangement and with the diamonds of the upper row slightly exposed, as at 27, ready for use as a cutting tool. The tool 26 is then placed within the large end 12 of a tool holder 10 and brazed or otherwise secured therein.

While it is not essential that the disk 15 be provided with a raised annular rim 17, as shown, this is preferable, since the provision of the rim insures good electrical contact during the welding operation. Also, the metal of the rim 17 provides sufficient excess metal to fill in the void cavities and completely enclose the diamonds without necessitating a complete melting of the metal of the bodies of the disks. There is thus but little, if any, tendency of the diamonds to become displaced from their predetermined arrangement in the recesses 16.

The collar 20 serves to prevent lateral displacement of the metal of the disk during the upsetting operation. The metal and dimensions of the collar 20 are so selected as to withstand the lateral forces induced by the upsetting operation.

Various metals and metal alloys may be used in forming the disks 15. The following will indicate metals and alloys that have been found suitable:

Cast iron

High carbon steel, such as a steel of 99% iron and 1% carbon

Nickel-iron alloys of the type 60% nickel and 40% iron

Nickel-copper alloys of the type 70% nickel and 30% copper

Brasses, bronzes and copper

Of the foregoing metals and alloys, I have found that a high carbon steel possesses very satisfactory properties for use in the making of diamond impregnated tools in accordance with the method of my invention. The high carbon steel is obtained in the form of drill rods, which are then machined to provide disks similar to the disk 15. The welding temperature of such high carbon steels is approximately 2500° F., which is sufficiently below the temperature at which the abrasive and cutting properties of diamonds are destroyed.

A suitable type of welding machine for carrying out the welding and upsetting operation is readily available among the conventional types of spot welding machines on the market. The time of the welding and upsetting operation will, of course, vary with the particular type of metal or metal alloy selected and also with the mass of metal used, but in general will not be over about 30 seconds. In some instances, little if any upsetting is required, but generally a slight amount of upsetting is necessary to cause the metal to fill up the voids and to closely contact and surround the abrasive particles. Otherwise the abrasive particles are likely to fall out as they become exposed during the use of the tool.

Other methods may be employed than welding in the formation of the diamond impregnated matrix. For instance, the pile of superimposed disks may be placed within a graphite crucible or the like and the whole heated to a softening temperature, as by being placed within a high frequency induction furnace. This method is not so satisfactory since the work cannot be observed and the progress of the heating can only be estimated by reading the temperature of the graphite crucible. There is also no means of accurately controlling the amount of pressing or forging which is given to the metal in the crucible. Another disadvantage is that carbon may possibly be absorbed by the metal from the graphite of the crucible and thus alter the physical characteristics of the matrix.

It will be appreciated that the form and dimensions of the elements making up the assembly illustrated in Figs. 5 and 6, as well as the number and arrangement of the diamond particles 19, may be varied considerably. For instance, instead of the recesses 16, holes, or perforations, may be used, and the disks may be assembled with the diamonds in staggered, rather than aligned, relation. Likewise, only a single disk, or one or a fewer number of diamonds than shown in the drawing, may be used.

As examples of types of alloy irons that can be used in making the disks 15 may be mentioned alloy irons containing small quantities of alloying ingredients, such as silicon, nickel, molybdenum, chromium and vanadium. The following formulae are illustrative:

|  | Per cent |
|---|---|
| Carbon | 2.70 |
| Silicon | 1.80 |
| Nickel | 1.50 |
| Molybdenum | 0.50 |
| Vanadium | 0.15 |
| Iron | Balance |
| Carbon | 2.90 |
| Silicon | 1.90 |
| Molybdenum | 0.25 |
| Chromium | 0.25 |
| Vanadium | 0.10 |
| Iron | Balance |

Alloy irons such as the foregoing become comparatively hard and very tough after being subjected to heat and pressure, and for that reason are very satisfactory for use in making diamond impregnated tools.

As a slight modification in the preferred method disclosed herein, prior to being placed in the welding machine, the assembly comprising the disks 15, upsetting ends 21 and 22 and collar 20 is placed in a vise, or other means for effecting strong compression, and pressure applied to the ends of the upsetting ends to squeeze the disks 15 together. The purpose of this is to insure good electrical contact between the disks and upsetting ends before placing the assembly in the welding machine, since, due to imperfections in the formation of the disks, undersizing or oversizing of the rims, or the like, there might otherwise be faulty surface contact between the various elements of the assembly. The compression of the disks and upsetting ends tends to hold the disks closely against one another and also, in part, to close the recesses or holes in which the diamonds are positioned, so that even before the assembly is placed between the electrodes, a certain definite relationship between the disks and the diamonds themselves is established.

I am aware that many changes may be made and numerous details of construction may be varied through a wire range without departing from the principles of this invention, and I, therefore, do not purpose limiting the patent granted hereon otherwise than necessitated by the prior art.

I claim as my invention:

1. The method of making diamond tools which comprises positioning diamonds in preformed recesses in a plurality of peripherally flanged metal disks, assembling a pile of such disks between end members within a confining collar, subjecting said disks to axially applied pressure to establish good electrical contact therebetween and applying sufficient electrical current to said disks to soften the metal thereof and particularly the metal of the flanges of said disks while simultaneously applying pressure thereto to cause said softened metal to flow around and enclose said diamonds.

2. The method of making diamond impregnated tools, which comprises forming a plurality of metal disks having raised peripheral rims and having diamond locating recesses in the depressed faces provided by said rims, positioning diamonds in said recesses, assembling said disks in superimposed and laterally confined relation between end abutments, subjecting said disks to endwise applied compression to force said disks into close contact with each other and to partly close said recesses about said diamonds, and applying sufficient electrical current and endwise pressure through said end abutments while preventing lateral displacement to soften the metal of said rims and cause said metal to flow around and embed said diamonds in their predetermined positions.

3. The method of making a tool, which comprises forming a metal plate with a peripheral flange surrounding a depressed face portion having spaced recesses therein, placing abrasive particles in said recesses, assembling a plurality of such plates in superimposed relation, subjecting said assembled plates to endwise pressure while confining said plates laterally and applying sufficient heat to said assembled plates to cause the metal of said flanges to flow into the spaces between said plates and around said abrasive particles to enclose and embed the same in the resulting homogeneous matrix.

4. The method of making a diamond tool, which comprises forming a metal disk of high carbon steel, with a peripheral flange surrounding a depressed face portion having spaced recesses therein, placing diamond particles in said recesses, assembling a plurality of such disks in superimposed relation, subjecting said assembled disks to endwise pressure while confining said disks laterally and applying sufficient heat to said assembled disks to cause the metal of said flanges to flow into the spaces between said plates and around said diamond particles to enclose and embed the same in the resulting homogeneous matrix.

HARRY W. WALLACE.